United States Patent [19]

Shimada

[11] Patent Number: 5,182,500
[45] Date of Patent: Jan. 26, 1993

[54] BRUSHLESS MOTOR CONTROL CIRCUIT
[75] Inventor: Toshiro Shimada, Yokohama, Japan
[73] Assignee: Kabushiki Kaisha Toshiba, Kanagawa, Japan
[21] Appl. No.: 684,934
[22] PCT Filed: Sep. 13, 1990
[86] PCT No.: PCT/JP90/01172
    § 371 Date: Apr. 26, 1991
    § 102(e) Date: Apr. 26, 1991
[30] Foreign Application Priority Data
    Sep. 16, 1989 [JP] Japan ................ 1-240466
[51] Int. Cl.$^5$ .................................. H02P 6/02
[52] U.S. Cl. ................................ 318/254; 318/138
[58] Field of Search .................... 318/138, 254, 439

[56] References Cited
    U.S. PATENT DOCUMENTS
    4,658,190  4/1987  Miyazaki et al. ............ 318/254

FOREIGN PATENT DOCUMENTS
    1-136588  5/1989  Japan .

Primary Examiner—Bentsu Ro
Attorney, Agent, or Firm—Finnegan, Henderson, Farabow, Garrett and Dunner

[57] ABSTRACT

According to the present invention, control is performed to set a constant difference between two phase inputs among three phase inputs to a three-phase brushless motor. As a result, imbalance between the respective phase inputs (signals) is eliminated, thus performing motor control with good rotational precision. According to the present invention, amplifiers ($1_1$-$1_3$, $2_1$-$2_3$, $3_1$-$3_3$) for receiving rotor position detection signals of the motor are provided in common to the three-phase input lines of the three-phase brushless motor. One of the difference and the sum of a product of two phases signals, among three phase outputs from these amplifiers, and a signal as the square of the remaining phase signal is compared with a constant value. A comparison result signal is fed back to the amplifiers ($1_1$-$1_3$, or $2_1$-$2_3$, or $3_1$-$3_3$) of a common stage of the three-phase input lines to control the rotation of the motor. The product of the two phase signals is obtained by a multiplier (11). The square of the remaining one phase signal is obtained by a square multiplier (12). One of the sum and the difference of the product and the square signals is obtained by an arithmetic unit (13 or $13_1$). The arithmetic unit output and the constant value are compared by a comparator (14).

7 Claims, 8 Drawing Sheets

BRUSHLESS MOTOR CONTROL CIRCUIT

FIELD OF THE INVENTION

The present invention relates to a brushless motor control circuit for controlling rotation of a brushless motor.

DESCRIPTION OF RELATED ART

Figure 1:
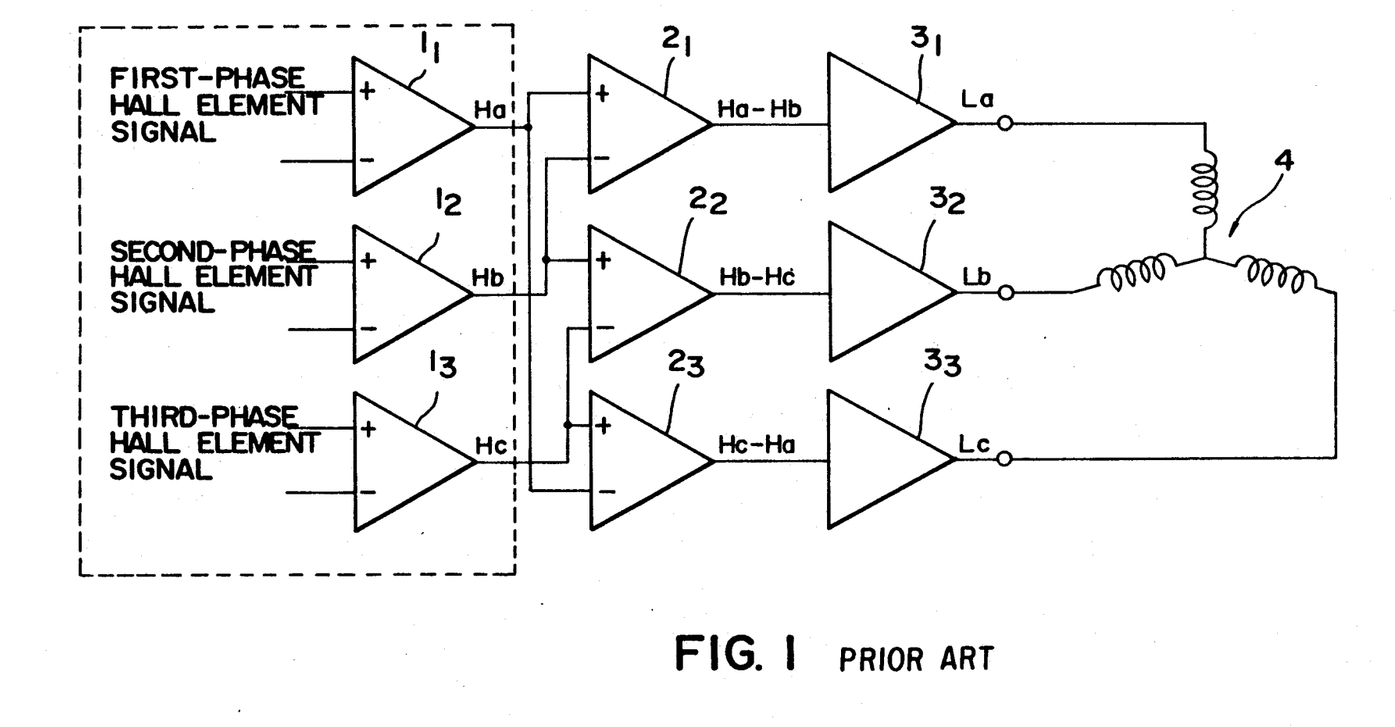
FIG. 1 is a circuit diagram of a conventional brushless motor control circuit.

FIG. 1 shows an example of a conventional drive circuit of a brushless motor. Signals $H_a$, $H_b$, and $H_c$ of three Hall elements used as rotor position detecting elements of a three-phase brushless motor are amplified by amplifiers $1_1$, $1_2$, and $1_3$. To reduce third harmonic component, a difference "$H_a-H_b$", a difference "$H_c-H_a$", and a difference "$H_c-H_a$" are obtained respectively by amplifiers $2_1$, $2_2$, and $2_3$. Output signals from the amplifiers $2_1$, $2_2$, and $2_3$ are amplified by amplifiers $3_1$, $3_2$, and $3_3$ to obtain output signals $L_a$, $L_b$, and $L_c$, thereby driving a motor coil (stationary) 4.

Figure 2:
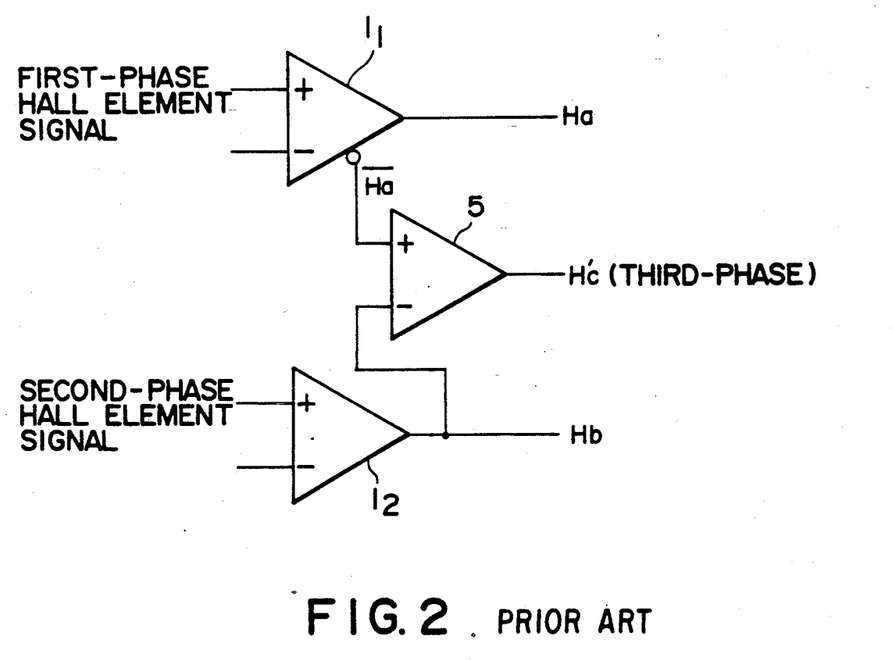
FIG. 2 is a circuit diagram showing a modification of a first-stage differential amplifier of the circuit shown in FIG. 1.

Another circuit example is also conventionally employed as shown in FIG. 2 in which the output signals from two Hall elements are synthesized by an amplifier 5 to obtain a signal $H_c'$ which is equivalent to the third output signal of FIG. 1. Signals $H_a$ and $H_b$, and the signal $H_c'$ are processed in the same manner as in FIG. 1, thereby driving a motor coil 4 (not shown in FIG. 2).

However, with the drive circuit shown in FIGS. 1 or 2, when the motor position detecting elements, i.e., the Hall elements, are incorporated in a motor, a variation in the Hall elements or imbalance during motor assembly may occur. Hence, it is difficult to obtain three or two Hall element signals that are amplified in a similar manner.

This leads to the following problem. The outputs $L_a$, $L_b$, and $L_c$ that finally drive the motor coil 4 are adversely influenced by variations in Hall element output signals, amplifiers, and motor coils and become unbalanced with respect to ideal output signals (motor coil drive signals in which only the phases are shifted from each other by 120° and which have no imbalance regarding other conditions, e.g., amplitudes.) Then, the motor coil windings of the respective phases are driven in an unbalanced manner to increase a torque ripple, thus, reducing rotational precision.

It is, therefore, an object of the present invention to perform well-balanced motor driving which is free from an adverse influence caused by variation in Hall elements as the position detecting elements or in motor assembly.

SUMMARY OF THE INVENTION

A brushless motor control circuit according to the present invention is characterized by comprising a three-phase brushless motor, amplifiers, commonly provided to three-phase input lines of the motor, for receiving rotor position detection signals of the motor, and a control circuit for comparing, with a constant value, one of a difference and a sum of a product of two phase signals, among three phase outputs of the amplifiers, and a signal as a square of the remaining phase signal, and feeding back a comparison result signal to the amplifiers of common stages of the three-phase input lines, thereby controlling rotation of the motor.

More specifically, three Hall elements as rotor position detecting elements are used, and are arranged on the rotor side such that their phases are shifted from each other by 120°. Then, the signals input to the three-phase motor coil are shifted from each other by 120°. Similarly, when two Hall elements are used, they are also arranged such that their phases are shifted from each other by 120°. Therefore, the third signal formed by using the two signals is also phase-shifted from the two signals by 120°. Assuming that signals whose phases are shifted from each other by 120° are "$H_a = K \times \sin\alpha$, $H_b = K \times \sin(\alpha+120°)$, $H_c = K \times \sin(\alpha+240°)$", it is possible to prove that the following relation:

$$H_a \times H_b - H_c^2 = H_b \times H_c - H_a^2 \\ = H_c \times H_a - H_b^2 = \text{constant} \quad (1)$$

or $$H_a \times H_b + H_c^2 = H_b \times H_c + H_a^2 \\ = H_c \times H_a + H_b^2 = \text{constant} \quad (2)$$

in numeric operation is established for all the values $\alpha$ can take. Ideally, since the outputs $L_a$, $L_b$, and $L_c$ become signals that are shifted from each other by 120°, a following relation is established:

$$L_a \times L_b \pm L_c^2 = L_b \pm L_c \pm L_a^2 \\ = L_c \times L_a \pm L_b^2 = \text{constant} \quad (3)$$

The fact that the three phase signals have a constant relationship with each other, in this manner, is utilized. A difference or sum between a signal as a product of a certain signal to one phase of a three-phase motor coil and another signal to another phase of the three-phase motor coil, and a square signal of a signal to still another phase is calculated. The calculated value (constant value) is compared with an arbitrary value. The comparison result is fed back to the bias current source or the like of the input amplifier for receiving the three phase currents. As a result, even when a certain one of the three phases is unbalanced, balanced three phase inputs can be obtained for the three-phase motor. In other words, control is performed in such a manner that the difference between two phase inputs among the three phase inputs is constant.

DESCRIPTION OF THE PREFERRED EMBODIMENTS

Figure 3:
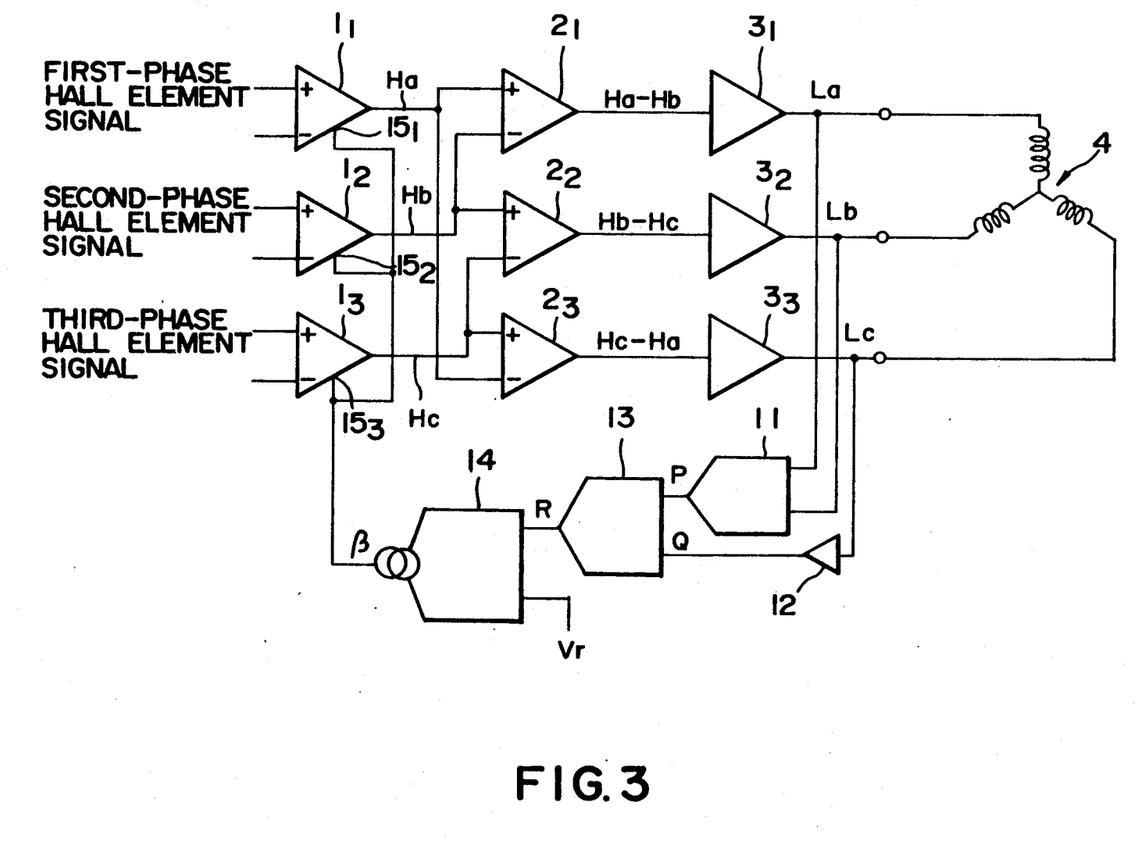
FIG. 3 is a circuit diagram of a brushless motor control circuit according to an embodiment of the present invention.

The present invention will be described in detail with reference to the accompanying drawings. FIG. 3 is a circuit diagram of a brushless motor control circuit according to an embodiment of the present invention. Since this embodiment corresponds to the conventional example of FIG. 3, the same reference numerals are used to denote the corresponding parts. More specifically, three Hall elements are arranged on the stator side of a three-phase brushless motor such that their phases are shifted from each other by 120°. The signals of the respective Hall elements are amplified by corresponding first-stage differential amplifiers $1_1$, $1_2$, and $1_3$ to become signals $H_a$, $H_b$, and $H_c$. For example, the outputs $H_a$ and $H_b$ are input to the non-inverting and inverting terminals, respectively, of a second-stage amplifier $2_1$ so that "$H_a-H_b$", "$H_b-H_c$", and "$H_c-H_a$" are obtained by second-stage amplifiers $2_1$, $2_2$, and $2_3$, respectively. The same applies to the inputs to the amplifiers $2_2$ and $2_3$. Outputs from the second-stage amplifiers $2_1$ to $2_3$ are amplified by final-stage amplifiers $3_1$ to $3_3$, respectively. Outputs $L_a$ to $L_c$ of the amplifiers $3_1$ to $3_3$ drive a motor coil 4. At the same time, the outputs $L_a$ and $L_b$ from the amplifiers $3_1$ and $3_2$ are input to a multiplier 11 to obtain a product signal P thereof. The output $L_c$ of the amplifier $3_3$ is input to a square multiplier 12 to obtain a square signal Q of the signal $L_c$. The difference between the signals P and Q is obtained by an arithmetic unit 13 as a signal R. The difference signal R is compared with an arbitrary constant value $V_r$ by a comparator 4, and the comparison result is output as a current output $\beta$. The current output $\beta$ is supplied to terminals $15_1$, $15_2$, and $15_3$ through a common bus so that it serves as a bias current source of the amplifiers $1_1$, $1_2$, and $1_3$.

Figure 4:
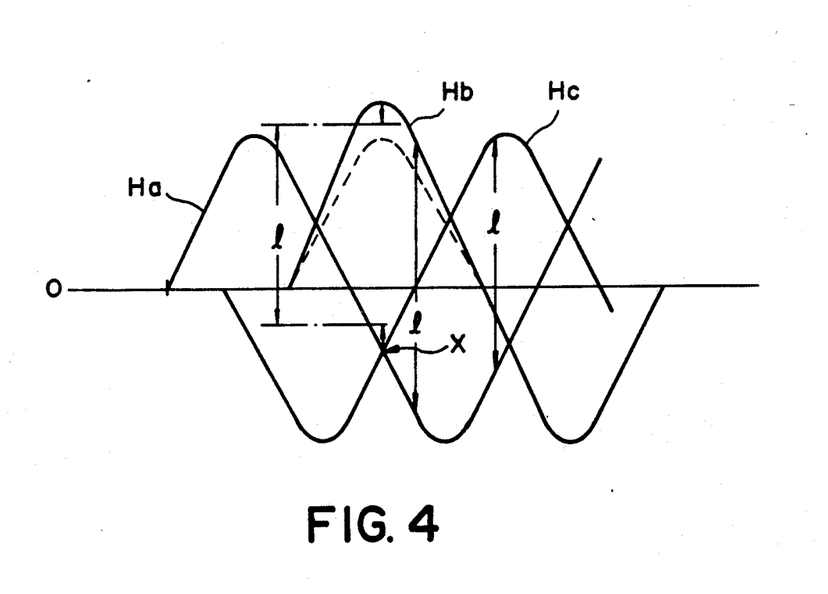
FIG. 4 is a signal waveform chart showing the operation of the circuit shown in FIG. 3, and FIGS. 5 to 9 are circuit diagrams, respectively, of brushless motor control circuits according to different embodiments of the present invention.

FIG. 4 shows the operation of the circuit shown in FIG. 3. In this case, only the output $H_b$ from the amplifier $1_2$ becomes higher than the normal outputs from the amplifiers $1_1$ and $1_3$ due to the imbalance of the second-phase Hall element signal. The current source output $\beta$ from the comparator 14 is commonly supplied to the amplifiers $1_1$ to $1_3$. Namely, feedback is performed in such a manner that the above relation "$L_a \times L_b - L_c^2 =$ constant" is established. A common bias current is supplied to the amplifiers $1_1$ to $1_3$ to perform amplitude adjustment. More specifically, control is performed such that the amplitude of the signal $H_b$ in the positive direction is reduced, that a crossing point x of the signals $H_a$ and $H_c$ is moved upward in the positive direction as shown in FIG. 4, and that a constant amplitude l is obtained accordingly. As a result, the amplitudes of the respective phases become the same, thus obtaining three phase motor coil control signals capable of performing well-balanced motor control. With this control, the difference between any two given phase inputs among the three phases inputs becomes constant at the respective portions of the signal waveforms, as indicated by a large number of l in FIG. 4.

Figure 5:
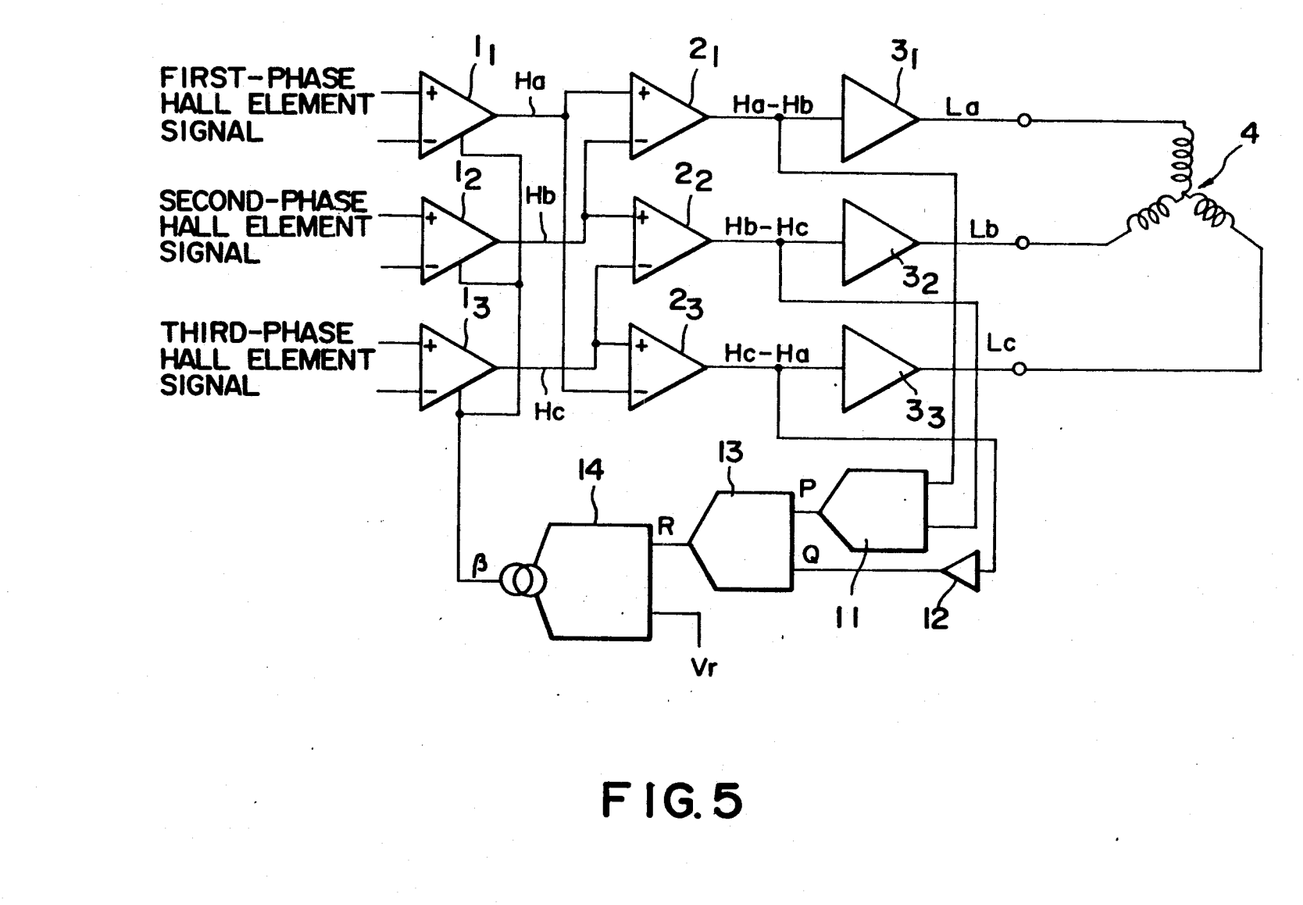
Figure 6:
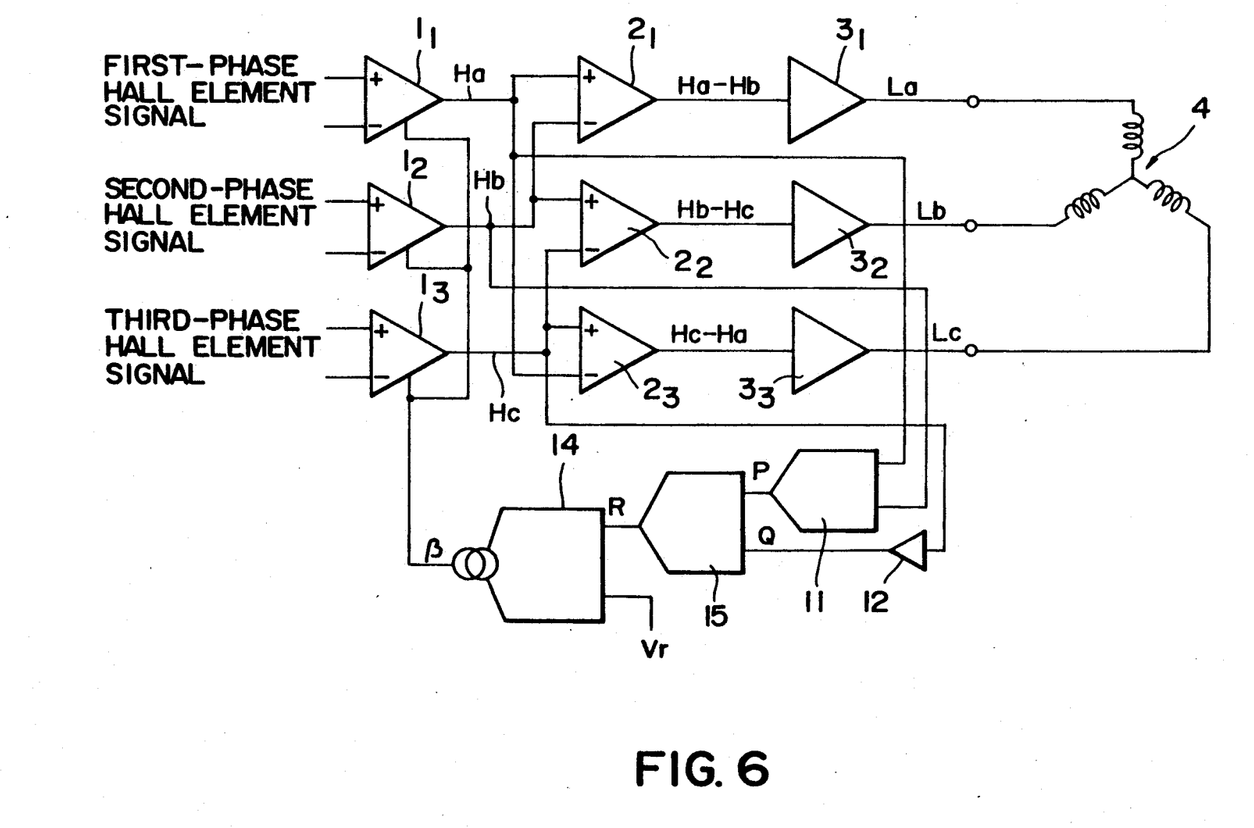
Figure 7:
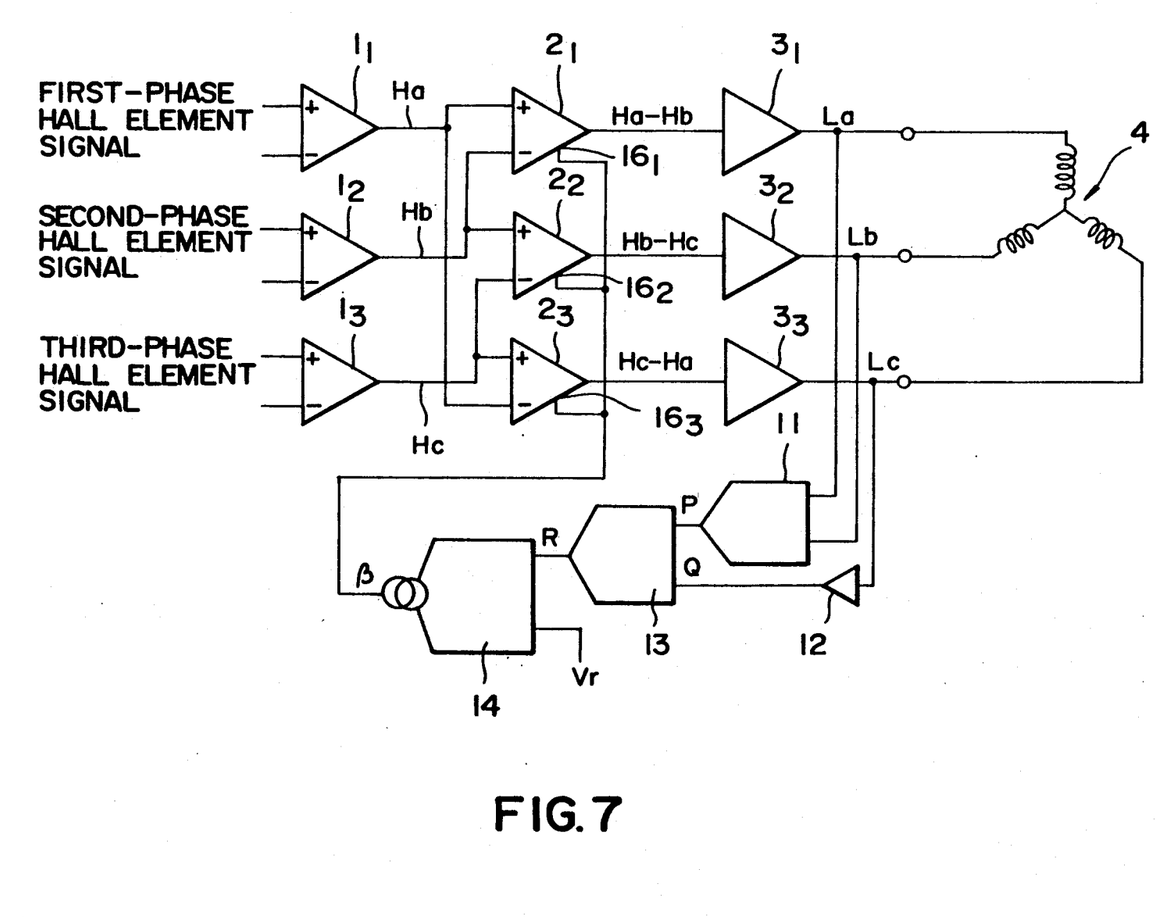
Figure 8:
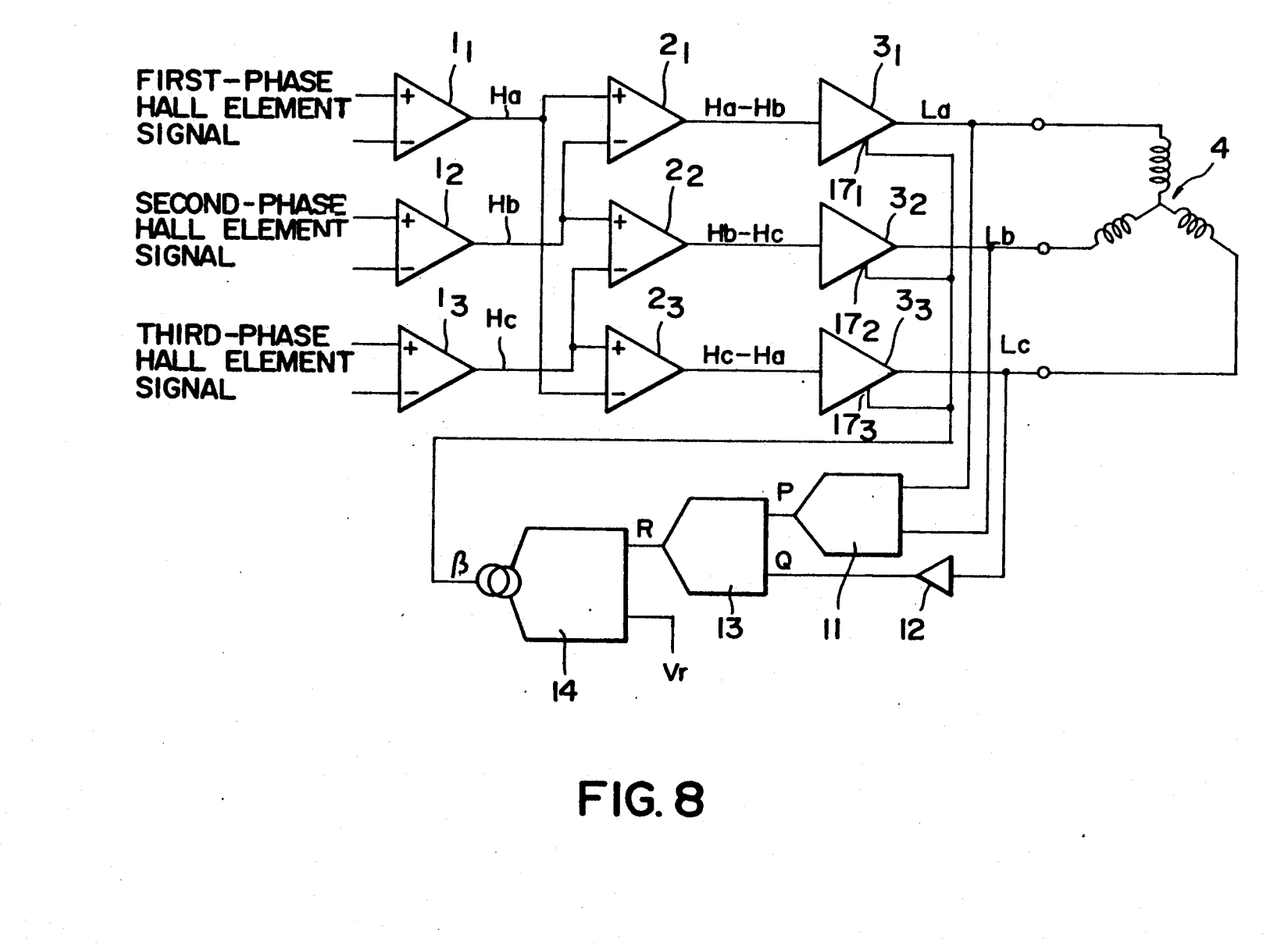
Figure 9:
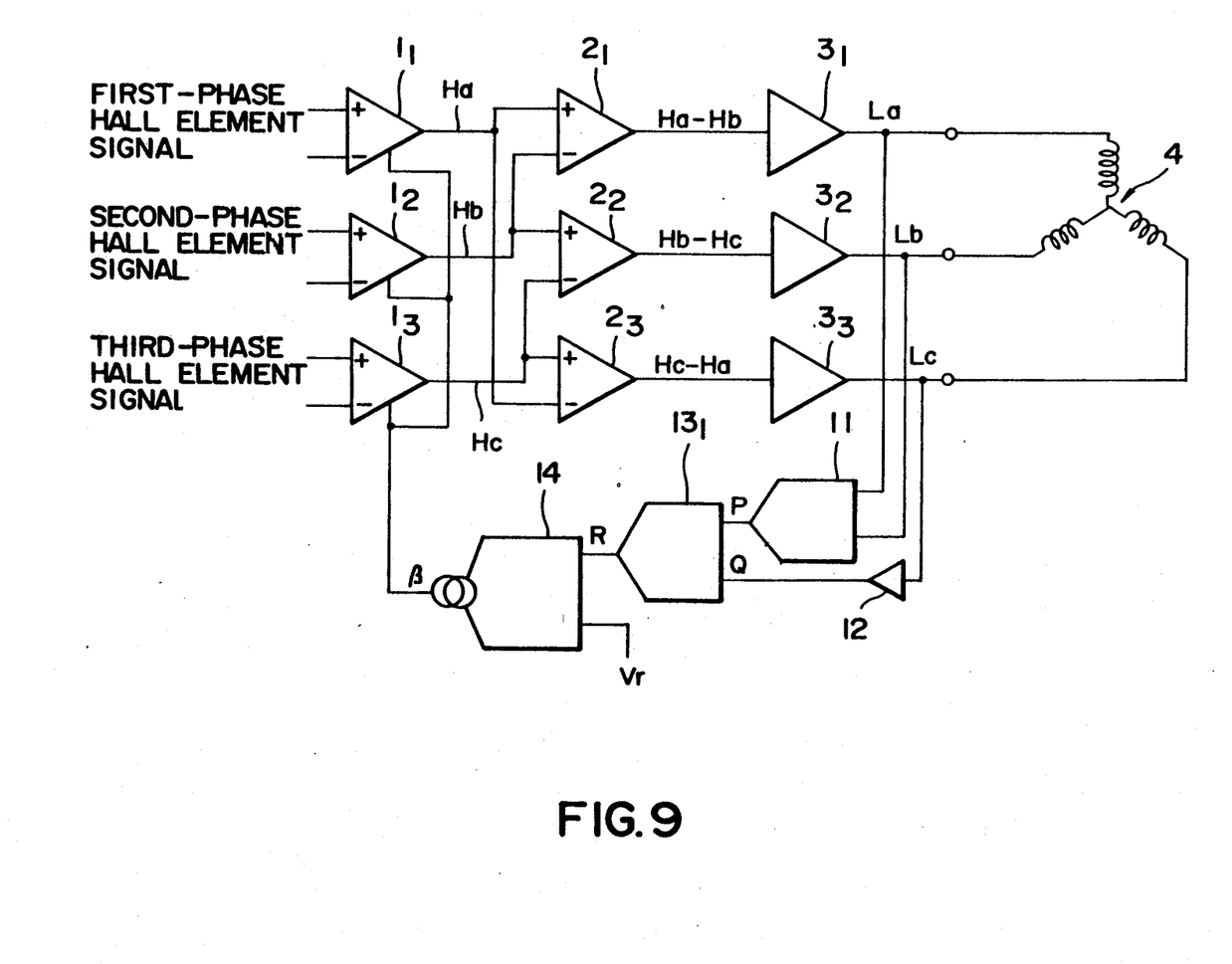

In this embodiment, the imbalance in amplitude of a Hall element signal as a rotor position detection signal is absorbed. However, the present invention is not limited to this but an imbalance such as a distortion in the three phases of the motor coil or in the amplifiers, i.e., the imbalance in the circuit elements to be used can also be absorbed. In the present invention, it is possible to use only two Hall element signals as signals to be input to the second-stage amplifier, as in FIG. 2. These signals are synthesized to obtain a signal $H_c'$ equivalent to the third Hall element signal, and the synthesis signal is used in place of the signal $H_c$. In the present invention, the signals $L_b$ and $L_c$, or the signals $L_c$ and $L_a$ may be input to the multiplier 11. In this case, the input to the square multiplier 12 is the signal $L_a$ or $L_b$. The signals to be input to the multiplier 11 and the square multiplier 12 may be outputs from the amplifiers $2_1$ to $2_3$ or $1_1$ to $1_3$. This is because any signals can be used as these input signals as far as they are phase-shifted from each other by 120°. FIG. 5 shows a case wherein the outputs from the amplifiers $2_1$ to $2_3$ are used as these input signals, and FIG. 6 shows a case wherein the outputs from the amplifiers $1_1$ to $1_3$ are used as these input signals. In the present invention, as shown in FIG. 7, the output from the comparator 14 may be fed back to terminals $16_1$ to $16_3$ for supplying a common bias current to the amplifiers $2_1$ to $2_3$. Alternatively, as shown in FIG. 8, the output from the comparator 14 may be fed back to terminals $17_1$ to $17_3$ to supply a common bias current to the amplifiers $3_1$ to $3_3$. This is because the imbalance between the signals can be corrected where desired. In the present invention, as shown in FIG. 9, a sum of a signal as a product of two arbitrary phase signals, among the three phase signals, and a signal obtained by squaring the remaining phase signal may be obtained by an arithmetic unit $13_1$, and the obtained sum may be compared with a constant value. This is because the relationships of equations (2) and (3) are established in any of these cases. Various other changes and modifications can be made within the spirit and scope of the invention.

The brushless motor control circuit according to the present invention is effective when it is used as a Hall motor control circuit packaged in an integrated circuit.

I claim:

1. A brushless motor system comprising:
   a three-phase motor;
   plural stages of amplifiers provided at each of three-phase input lines of said motor for receiving rotor position detection signals of said motor; and
   a control circuit for comparing, with a constant value, one of a difference an da sum of a product of two phase signals, among three phase signals outputted from said amplifiers, and a signal as a square of the remaining phase signal, and for feeding back a comparison result signal to said amplifiers on each line at the same stage of said plural stages of amplifiers, thereby controlling the rotation of said motor.

2. A brushless motor system according to claim 1, wherein the three phase signals are angular velocity signals having a phase difference of 120° from each other, and the comparison result signal fed back to said amplifiers is commonly supplied to the bias current source terminals of said amplifiers on each line at the same stage.

3. A brushless motor system according to claim 2, wherein the three phase signals are the rotor signals "$H_a-H_b$", "$H_b-H_c$", and "$H_c-H_a$" where $H_a$, $H_b$, and $H_c$ are position detection signals.

4. A brushless motor system according to claim 2, wherein the three phase signals are the rotor position detection signals $H_a$, $H_b$, and $H_c$.

5. A brushless motor system according to claim 2, wherein the three phase signals are sine wave signals.

6. A brushless motor system according to any one of claims 1, 2, 3, and 4, wherein the rotor position detection signals are Hall element signals.

7. A brushless motor system according to claim 1, wherein one of the three phase signals is obtained by synthesizing the two remaining phase signals.

* * * * *